Figure 1:
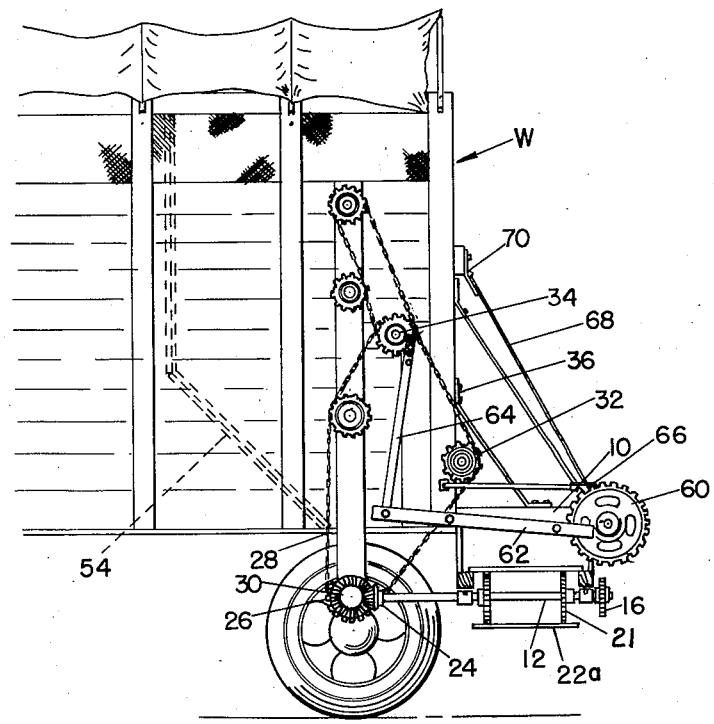

Feb. 11, 1958  G. J. VAN DRISSE  2,822,946
FORAGE WAGONS
Filed Feb. 13, 1956

INVENTOR.
GILBERT J. VAN DRISSE
BY Joseph G. Werner
ATTORNEY

United States Patent Office 2,822,946
Patented Feb. 11, 1958

2,822,946

FORAGE WAGONS

Gilbert J. Van Drisse, Two Rivers, Wis.

Application February 13, 1956, Serial No. 565,180

3 Claims. (Cl. 214—519)

The present invention relates to improvements in forage wagons or the like and is concerned more particularly with unloading apparatus therefor which is adapted to be initially installed in the wagon or added to existing conveyances, as desired.

An object of the invention is to provide a forage chopper wagon which may be quickly and efficiently unloaded directly to a forage crop blower without moving or otherwise altering the blower.

Another object of the invention is to provide a forage wagon or the like which is adapted to be unloaded from its front or forward end so that no backing up of the wagon is required.

A further object of the invention is to provide unloading apparatus which is adapted to be operated by the power take-off from a tractor which, if desired, may be the tractor normally used to haul the wagon and which requires no other source of power operating means.

Still another object of the invention is to provide a forage wagon or unloader from which the forage may be transferred directly to the blower conveyor quite automatically without any necessity for manual raking or clawing of the material out of the wagon.

Other objects and advantages of the invention will be apparent from the following detailed description taken in conjunction with the accompanying drawings wherein a preferred embodiment of the principles of the invention has been selected for exemplification.

Figure 2:
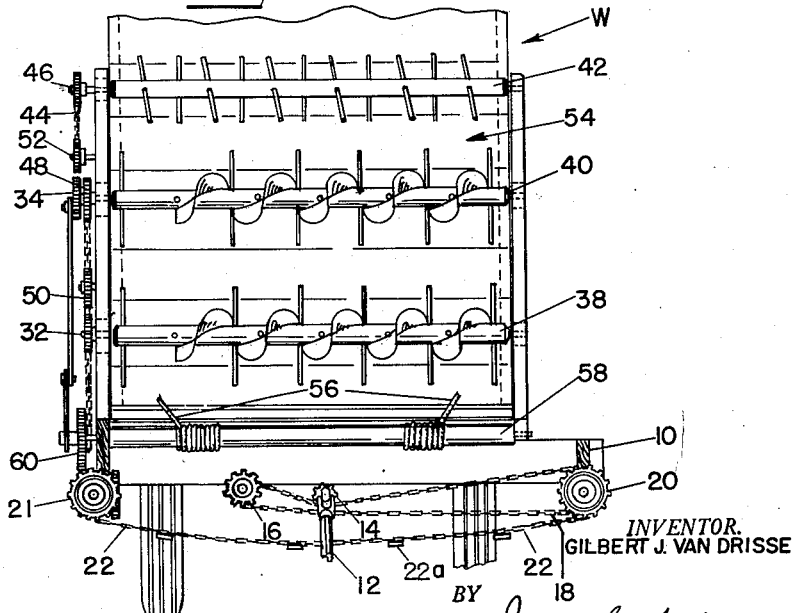

In the drawings:

Fig. 1 is a fragmentary side elevational view of the forward end portion of a forage wagon or the like having the unloading apparatus of the present invention operatively embodied therein; and Fig. 2 is an end view of the wagon as shown in Fig. 1.

Referring more particularly to the drawings, wherein like numerals refer to like parts, the forage wagon W, which may be regarded as illustrative of any other conveyance for bulk material to be unloaded, is provided with a forwardly projecting platform indicated in its entirety at 10. As shown, a spline shaft 12 extends forwardly of the platform 10 for operative engagement with the power take-off of a tractor or the like. A spline shaft sprocket 14 drives a sprocket 16 over which is trained a chain 18 for rotating sprocket 20 which, in turn, together with sprocket 21 operates endless conveyor chain 22 with transverse slats or bars 22a which are adapted to receive the unloaded material and to direct the same to one side of the wagon.

As further shown, a pinion 24 is keyed to the rearward end of spline shaft 12 and is operatively in mesh with a bevel gear 26 which is rotatably supported at the bottom of upright member 28 carried by a forward sidewall portion of the wagon W. Sprocket 30 which rotates with the bevel gear 26 drives sprockets 32 and 34 by means of the chain 36, as shown, thus to rotate the auger rollers 38 and 40 to which the sprockets 32 and 34 respectively are keyed. The upper roller member 42 is rotated by a chain 44 and sprockets 46 and 48, the latter being keyed to the same shaft as the sprocket 34. The additional sprockets 50 and 52 are chain tightener sprockets which may be employed, if desired.

For advancing forage or other material from the interior of the wagon toward the rollers 42, 40 and 38 and the conveyor means 22 at the discharge end thereof, a follower member in the form of a gate or wall 54 is positioned upright in the interior of the wagon and is disposed normally at the opposed or rearward interior end thereof.

For moving the follower 54 so as to advance the forage or other material to the discharge end, cables 56 are provided which have their extended ends secured to the follower 54 and their forward ends fastened to a reel or other cylindrical roller 58 which is adapted to be rotated to take up the cables 56 whereby to draw the follower 54 forwardly. For rotating the reel 58 a ratchet wheel 60 keyed to an end thereof is rotated by crank arms 62 and 64, the latter being pivoted eccentrically to the sprocket 34. From the foregoing, it will be apparent that the conveyor 22 and the material treating and discharge rollers 38, 40 and 42 are adapted to be simultaneously operated from the single source of tractor power and at the same time the follower 54 is advanced in a positive step by step movement so as constantly to supply forage or other material to the rollers and the conveyor until the load is completely discharged. The speed with which the forage is fed to conveyor 22 may be regulated by adjusting the length of crankarm 64 between sprocket 34 and crankarm 62.

In order to return the follower 54 to a position toward the rear of the wagon, ratchet pawl 66 is raised and follower 54 may then be pulled back toward the rear of the wagon, for example, by a cable attached to a winch (not shown). When the follower has been pulled back to the desired position pawl 66 may again be engaged with ratchet wheel 60 to prevent the follower 54 from sliding or being pushed rearward while in operation or when the wagon is reloaded or otherwise used.

A shield 68 made of metal or other suitable material may be hingedly attached to the wagon at 70, which shield, when lowered prevents the forage or other material from falling to the ground in front of the wagon.

It is to be understood that the present invention is not confined to the precise construction and arrangement of parts herein illustrated and described but embraces all such modifications thereof as come within the scope of the following claims.

I claim:

1. In combination with a storage chamber having a material discharge end, unloading apparatus for said material which comprises, a plurality of vertically spaced auger rollers rotatably secured to opposed walls of said chamber adjacent said discharge end for advancing and treating said material, a discharge conveyor carried by said chamber exteriorly of said discharge end for receiving treated material from said rollers and conveying the same transversely away from said chamber, a movable follower disposed normally adjacent the end of said chamber opposed to said discharge end, the lower portion of said follower being nearer the discharge end than the upper portion thereof, rotatable reel means carried by said chamber exteriorly of said discharge end, crank means operatively secured to one of said rollers for rotating said reel means, pull cable means connected between said follower and said reel to pull said follower toward said discharge end as said reel is rotated whereby to advance material from the interior of said chamber to said rollers at the discharge end of said chamber, driving means for said rollers and means for operatively connecting said driving means to the power take-off of a tractor.

2. In unloading apparatus for a forage wagon or the like including roller means and a discharge conveyor at one end of said wagon, the improvement which comprises, a movable follower disposed normally in the opposed end of said wagon and means for advancing said follower along the length of said wagon as forage is unloaded, the said advancing means including a reel rotatably supported at the discharge end of said wagon, pull cable means secured between said reel and said follower, said discharge conveyor being disposed between said follower and said reel, means for adjusting the speed at which said follower is advanced and means for guiding the forage upon the discharge conveyor.

3. In combination with a storage chamber having a material discharge end, unloading apparatus for said material which comprises, a plurality of vertically spaced auger rollers rotatably secured at said discharge end for advancing and treating said material, discharge conveyor carried by said chamber exteriorly of said discharge end for receiving treated material from said rollers and conveying the same transversely away from said chamber, a movable follower disposed normally adjacent the end of said chamber opposed to said discharge end, rotatable reel means carried by said chamber exteriorly of said discharge end, crank means operatively secured to one of said rollers for rotating said reel means, pull cable means connected between said follower and said reel to pull said follower toward said discharge end as said reel is rotated whereby to advance material from the interior of said chamber to said rollers at the discharge end of said chamber, driving means for said rollers and means for operatively connecting said driving means to the power take-off of a tractor.

References Cited in the file of this patent

UNITED STATES PATENTS

| | | |
|---|---|---|
| 2,298,982 | Smith | Oct. 13, 1942 |
| 2,463,643 | Recker | Mar. 8, 1949 |
| 2,601,618 | Kringle | June 24, 1952 |
| 2,606,677 | Snedeger | Aug. 12, 1952 |
| 2,676,002 | Wolfe | Apr. 20, 1954 |
| 2,715,972 | Grygiel | Aug. 23, 1955 |
| 2,743,832 | Kappelmann | May 1, 1956 |